(12) United States Patent
Latshaw

(10) Patent No.: US 6,712,104 B1
(45) Date of Patent: Mar. 30, 2004

(54) ROUTER JIG APPARATUS

(76) Inventor: John E. Latshaw, 12885 Dye St., South Dayton, NY (US) 14138

( * ) Notice: Subject to any disclaimer, the term of this patent is extended or adjusted under 35 U.S.C. 154(b) by 0 days.

(21) Appl. No.: 10/334,306

(22) Filed: Jan. 2, 2003

(51) Int. Cl.[7] .................................................. B27C 5/00
(52) U.S. Cl. ................................. 144/145.2; 144/145.1; 144/372; 409/110; 409/130
(58) Field of Search ............................ 144/145.1, 145.2, 144/145.3, 153, 154, 372; 409/110, 125, 130

(56) References Cited

U.S. PATENT DOCUMENTS

| | | | |
|---|---|---|---|
| 4,281,694 A | 8/1981 | Gorman | |
| 4,445,553 A | * 5/1984 | Hanyzewski et al. | .... 144/145.2 |
| 4,644,985 A | * 2/1987 | Weaver | .................... 144/145.1 |
| 4,809,755 A | * 3/1989 | Pontikas | ...................... 144/372 |
| 5,080,152 A | 1/1992 | Collins et al. | |
| 5,203,389 A | 4/1993 | Goodwin | |
| D337,501 S | 7/1993 | Witt | |
| 5,694,994 A | 12/1997 | Engle, III et al. | |
| 5,816,300 A | 10/1998 | Rogers | |
| 5,960,843 A | * 10/1999 | Witt | ............................ 144/372 |
| 6,588,468 B1 | * 7/2003 | Tucker et al. | ................ 144/372 |

* cited by examiner

Primary Examiner—W. Donald Bray

(57) ABSTRACT

A router jig apparatus for forming dowel which can be used for stair railings, in particular. The router jig apparatus includes a support table having a tabletop and leg members for supporting the tabletop; and also includes a router assembly including a motor being attached to an underside of the tabletop and also including a router bit being actuated by the motor; and further includes a template assembly including a plate being movably disposed upon a top of the tabletop, and also including a work piece support member being disposed upon the plate for supporting a work piece to be routed by the router bit.

8 Claims, 6 Drawing Sheets

ROUTER JIG APPARATUS

BACKGROUND OF THE INVENTION

1. Field of the Invention

The present invention relates to router jigs and more particularly pertains to a new router jig apparatus for forming dowel which can be used for stair railings, in particular.

2. Description of the Prior Art

The use of router jigs is known in the prior art. More specifically, router jigs heretofore devised and utilized are known to consist basically of familiar, expected and obvious structural configurations, notwithstanding the myriad of designs encompassed by the crowded prior art which have been developed for the fulfillment of countless objectives and requirements. Known prior art includes U.S. Pat. No. 5,694,994; U.S. Pat. No. 4,281,694; U.S. Pat. No. 5,203,389; U.S. Pat. No. 5,816,300; U.S. Pat. No. 5,080,152; and U.S. Pat. No. Des. 337,501.

While these devices fulfill their respective, particular objectives and requirements, the aforementioned patents do not disclose a new router jig apparatus. The prior art includes complex assemblies of tabletops, turntables, routers, and motors for driving the routers.

SUMMARY OF THE INVENTION

The general purpose of the present invention, which will be described subsequently in greater detail, is to provide a new router jig apparatus which has many of the advantages of the router jigs mentioned heretofore and many novel features that result in a new router jig apparatus which is not anticipated, rendered obvious, suggested, or even implied by any of the prior art router jigs, either alone or in any combination thereof. The present invention includes a support table having a tabletop and leg members for supporting the tabletop; and also includes a router assembly including a motor being attached to an underside of the tabletop and also including a router bit being actuated by the motor; and further includes a template assembly including a plate being movably disposed upon a top of the tabletop, and also including a work piece support member being disposed upon the plate for supporting a work piece to be routed by the router bit. None of the prior art includes the combination of the elements of the present invention.

There has thus been outlined, rather broadly, the more important features of the router jig apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new router jig apparatus which has many of the advantages of the router jigs mentioned heretofore and many novel features that result in a new router jig apparatus which is not anticipated, rendered obvious, suggested, or even implied by any of the prior art router jigs, either alone or in any combination thereof.

Still another object of the present invention is to provide a new router jig apparatus for forming dowel which can be used for stair railings, in particular.

Still yet another object of the present invention is to provide a new router jig apparatus that is easy and convenient to set up and use.

Even still another object of the present invention is to provide a new router jig apparatus that is specifically designed to make dowels precisely and quickly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
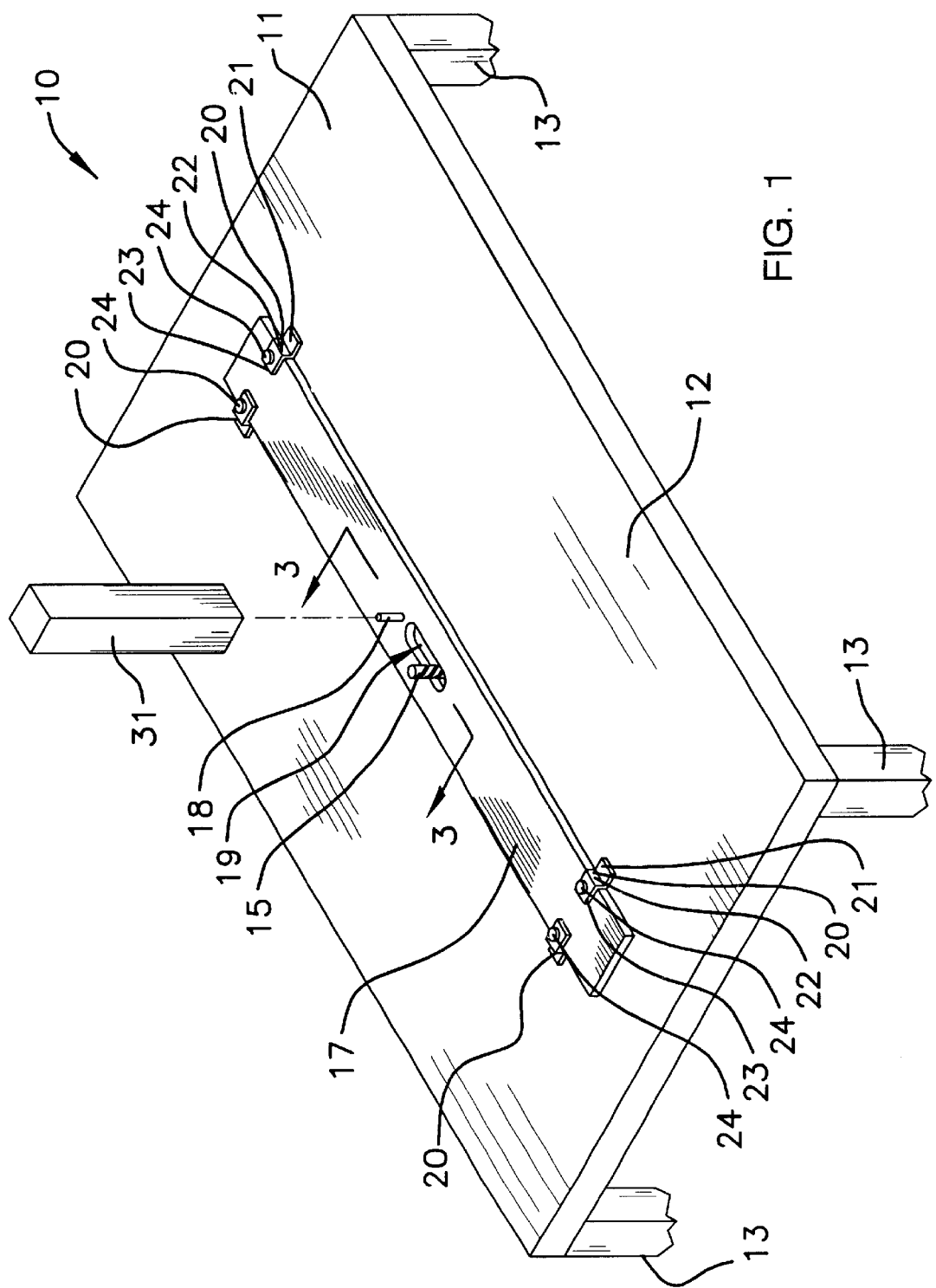
FIG. 1 is a perspective view of a new router jig apparatus according to the present invention.
Figure 2:
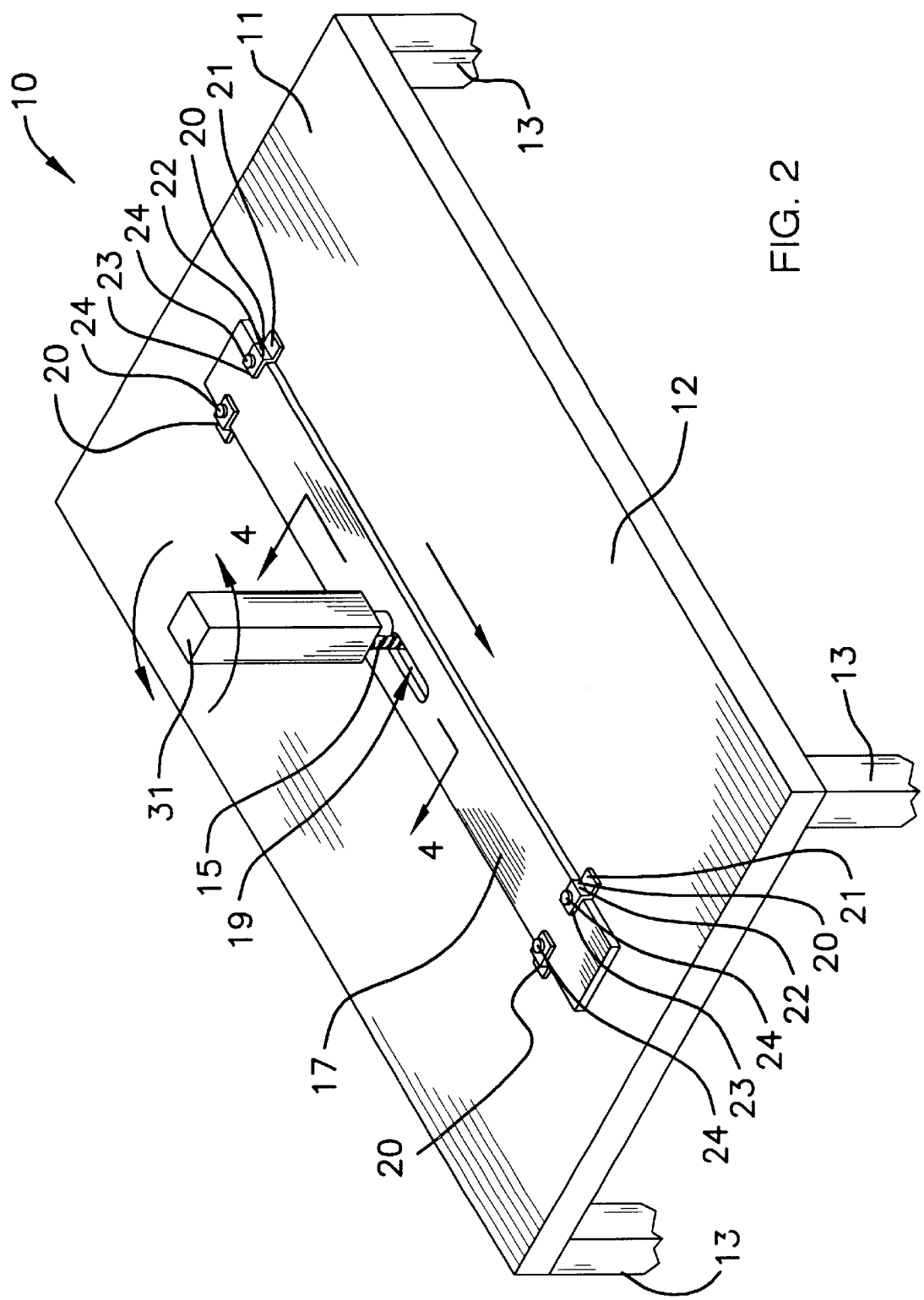
FIG. 2 is another perspective view of the present invention shown in use.
Figure 3:
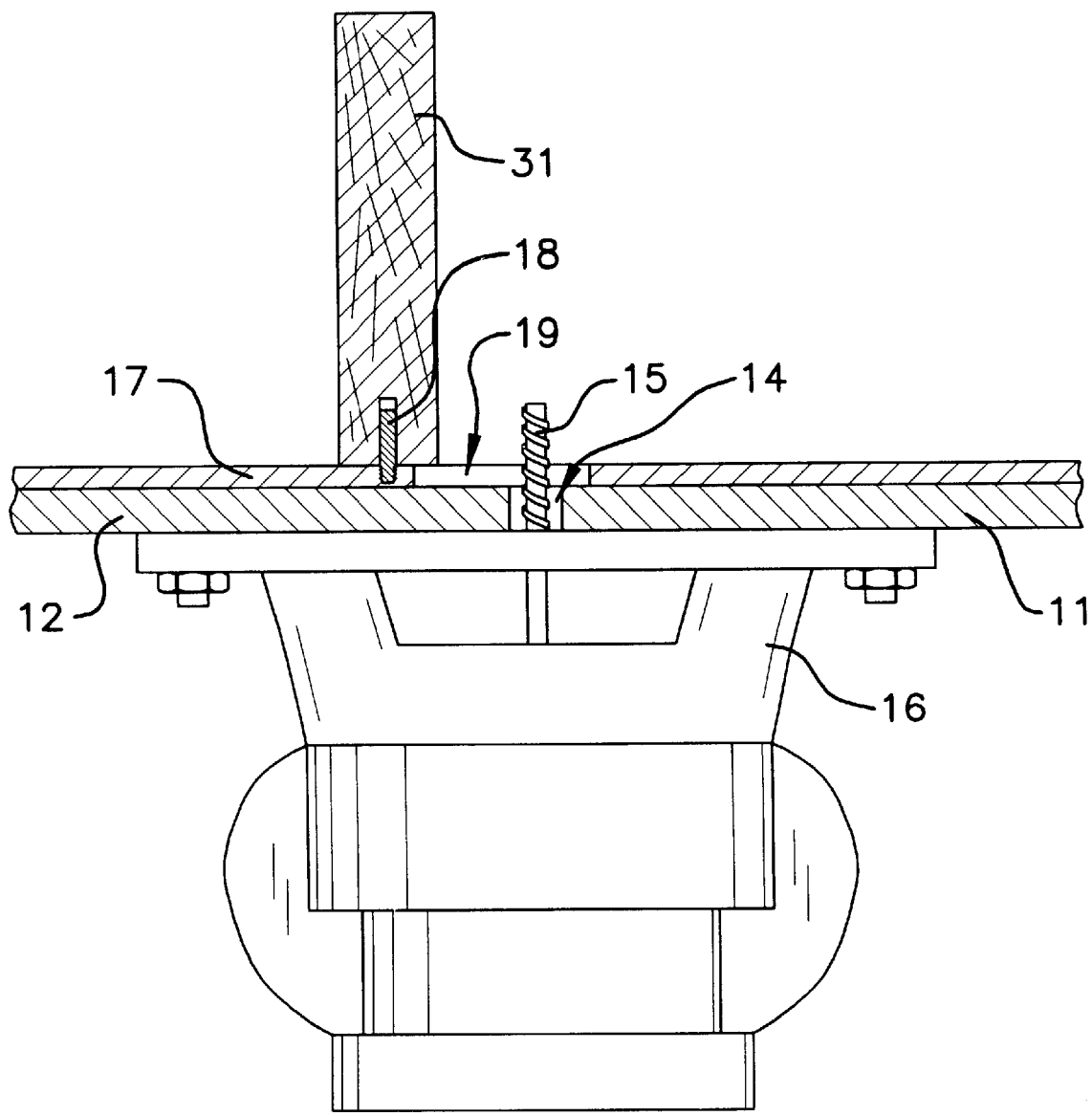
FIG. 3 is a cross-sectional view of the present invention.
Figure 4:
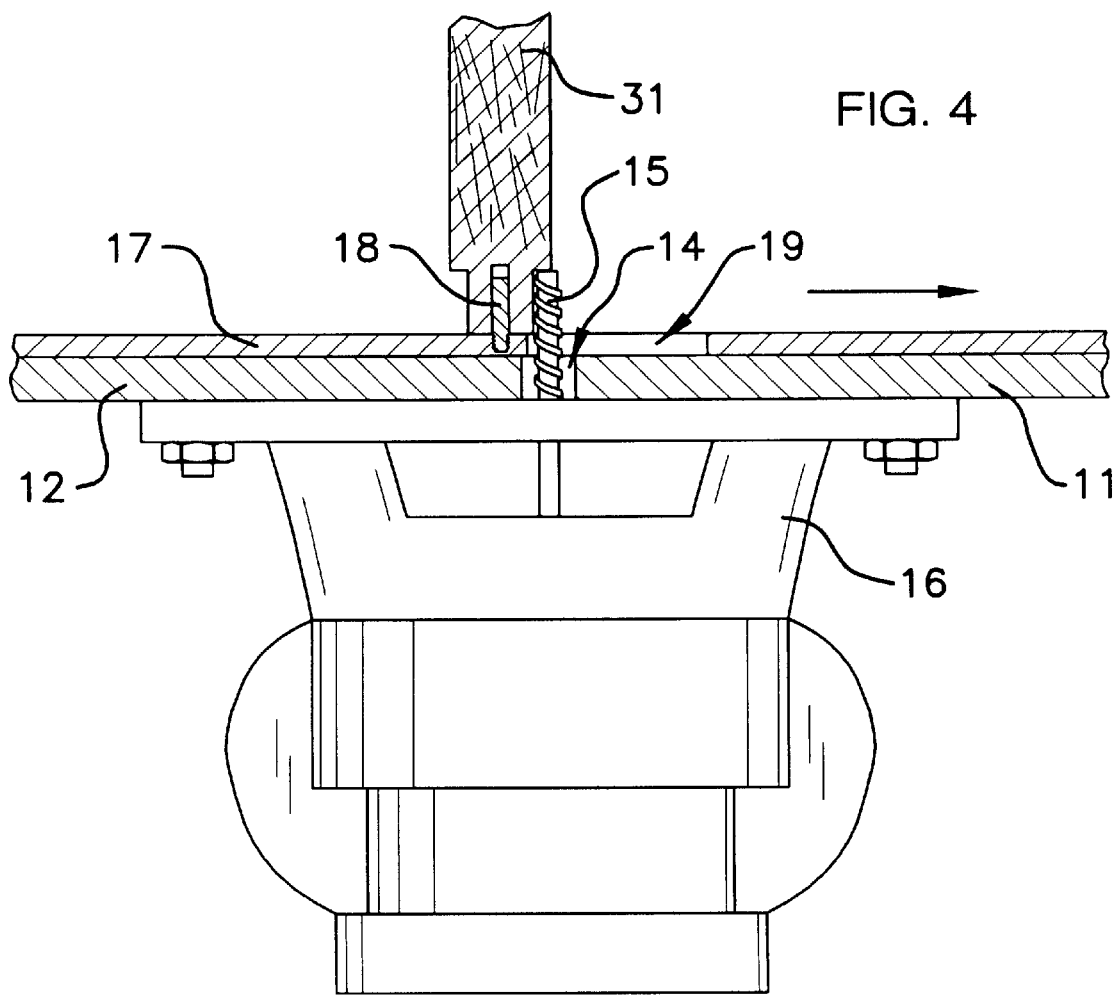
FIG. 4 is another cross-sectional view of the present invention shown in use.
Figure 5:
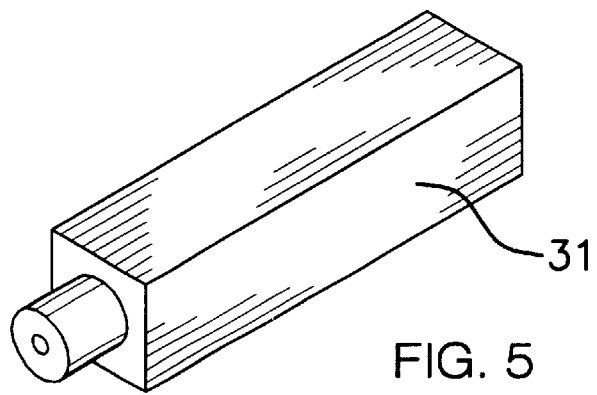
FIG. 5 is a perspective view of the end product from the present invention.
Figure 6:
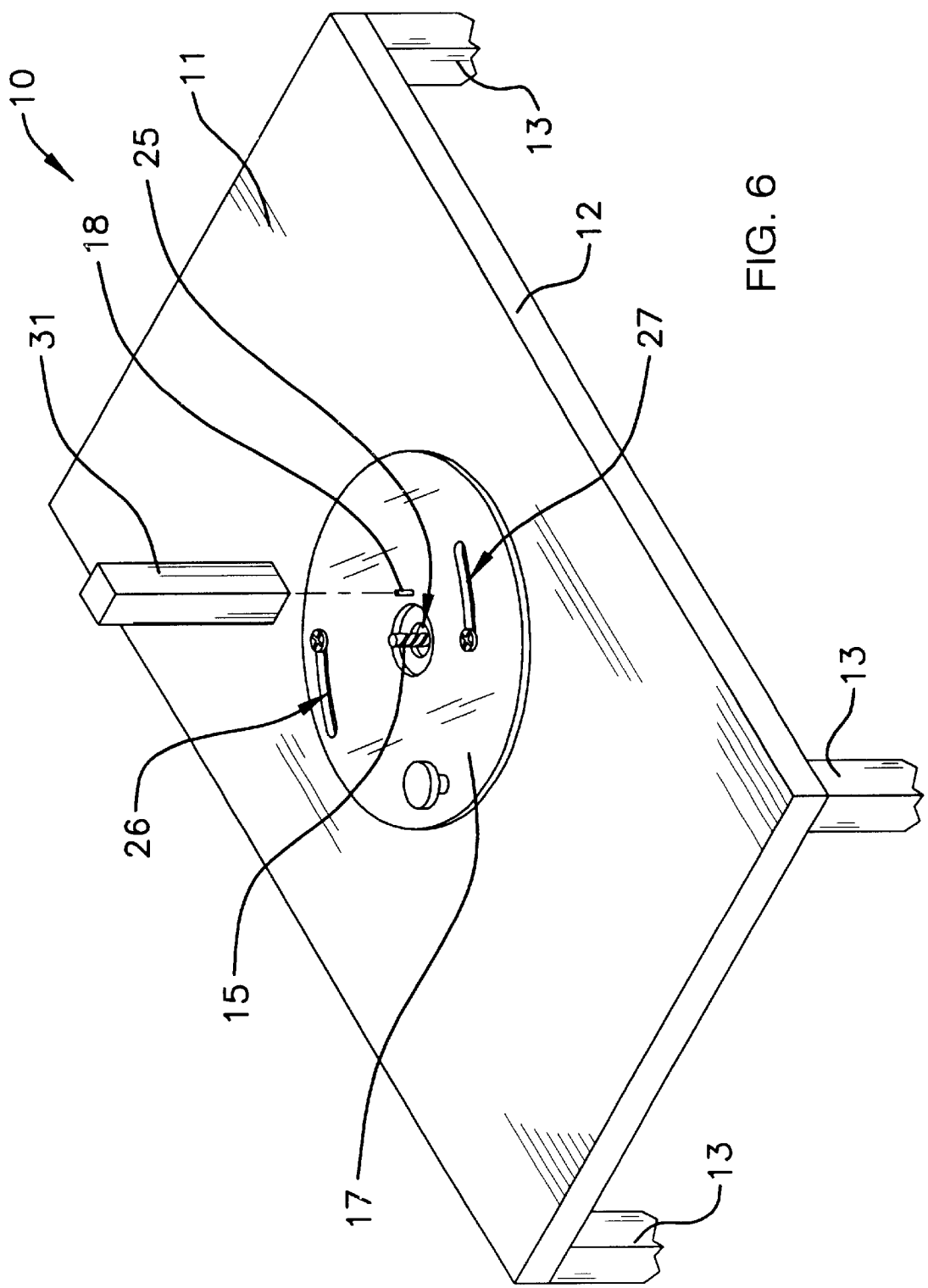
FIG. 6 is a perspective view of a second embodiment of the present invention.
Figure 7:
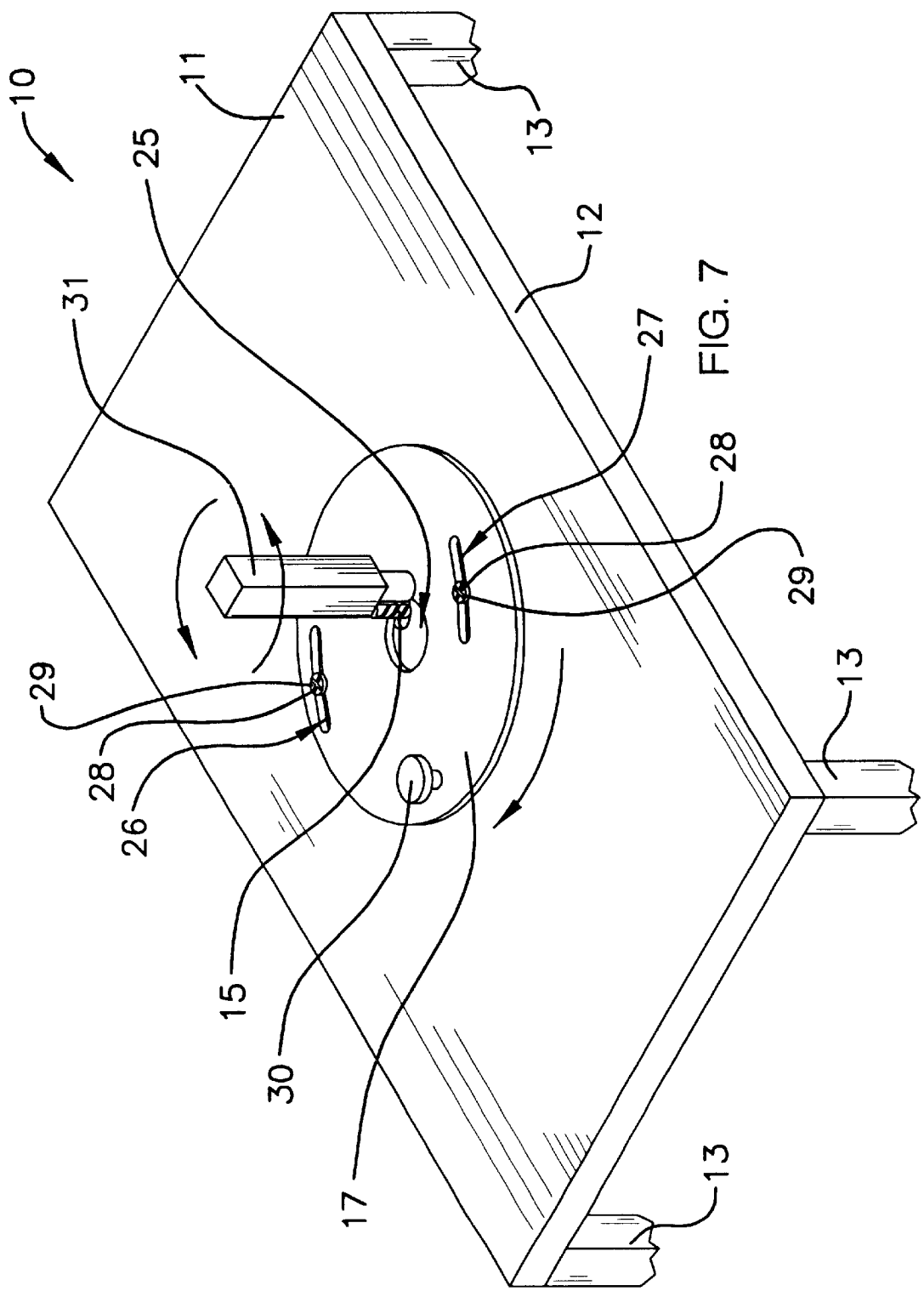
FIG. 7 is a perspective view of the second embodiment of the present invention shown in use.

With reference now to the drawings, and in particular to FIGS. 1 through 7 thereof, a new router jig apparatus embodying the principles and concepts of the present invention and generally designated by the reference numeral 10 will be described.

As best illustrated in FIGS. 1 through 7, the router jig apparatus 10 generally comprises a support table 11 having a tabletop 12 and leg members 13 for supporting the tabletop 12. The tabletop 12 includes an opening 14 being generally disposed through a central portion thereof. A router assembly includes a motor 16 being conventionally attached to an underside of the tabletop 12 and also includes a router bit 15 being conventionally actuated by the motor 16. The router bit 15 is rotatably disposed through the opening 14 of the tabletop 12.

A template assembly includes a plate 17 being movably disposed upon a top of the tabletop 12, and also includes a work piece support member 18 being conventionally disposed upon the plate 17 for supporting a work piece 31 to be routed by the router bit 15. The template assembly further includes plate retainer members 20–24,28,29 being conventionally attached to the top of the tabletop 12 for holding the plate 17 upon the tabletop 12. The work piece support member 18 is a post being conventionally disposed upon and extending outwardly from the plate 17 and is adapted to support the work piece 31. The plate 17 is an elongate rectangular shaped member having a longitudinal slot 19 being disposed therethrough proximate and adjacent to the post 18. The plate retainer members 20–24,28,29 include bracket members 20 being conventionally attached to the top of the tabletop 12 and being spaced to allowed the plate 17 to be movably disposed between the bracket members 20, and also includes fasteners 24 being threaded through the bracket members 20 and being engageable to the plate 17 for the securing thereof. Each of the bracket members 20 has a first end portion 21 which is securely and conventionally attached to the tabletop 12, and also has an intermediate portion 22 which is angled generally perpendicular to the first end portion 21, and further has a second end portion 23 which is angled generally perpendicular to the intermediate portion 22 and which is spaced above the tabletop 12 to allow the plate 17 to be disposed between the second end portion 23 and the tabletop 12. AS a second embodiment, the plate 17 is a disk having an opening 25 being centrally disposed therethrough and through which the router bit 15 is rotatably extended, and also having arc-shaped slots 26,27 being oppposedly disposed from one another and being disposed through the disk near a circumference thereof. The post 18 is disposed proximate and adjacent to the opening 25 through the disk. The plate retainer members 20–24,28,29 include fastening members 28 being conventionally attached to the tabletop 12 and being disposed through the arc-shaped slots 25,26, and also include washers 29 being conventionally attached to the fastening members 28 for retaining the disk upon the tabletop 12. The template assembly further includes a handle 30 being conventionally attached to the disk near the circumference thereof for rotating the disk back and forth to rout the work piece 31 being support upon the post 18.

In use, the user places the work piece 31 upon the post 18, and energizes the motor 16 which rotates the router bit 15, and the user then slides or rotates the plate 17 so that the work piece comes into contact with the router bit 15 which shapes and forms the work piece into a dowel which can used for many purposes.

As to a further discussion of the manner of usage and operation of the present invention, the same should be apparent from the above description. Accordingly, no further discussion relating to the manner of usage and operation will be provided. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the router jig apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A router jig apparatus comprising:

a support table having a tabletop and let members for supporting said tabletop, said tabletop including an opening being generally disposed through a central portion thereof;

a router assembly including a motor being attached to an underside of said tabletop and also including a router bit being actuated by said motor, said router bit being rotatable disposed through said opening of said tabletop;

a template assembly including a plate being movably disposed upon a top of said tabletop, and also including a work piece support member being disposed upon said plate for supporting a work piece to be routed by said router bit, said template assembly further including plate retainer members being attached to said top of said tabletop for holding said plate upon said tabletop.

2. The router jig apparatus as described in claim 1, wherein said work piece support member is a post being disposed upon and extending outwardly from said plate and is adapted to support the work piece.

3. The router jig apparatus as described in claim 2, wherein said plate is an elongate rectangular shaped member having a longitudinal slot being disposed therethrough proximate and adjacent to said post.

4. The router jig apparatus as described in claim 3, wherein said plate retainer members include bracket members being attached to said top of said tabletop and being spaced to allowed said plate to be movably disposed between said bracket members, and also include fasteners being threaded through said bracket members and being engageable to said plate for the securing thereof.

5. The router jig apparatus as described in claim 4, wherein each of said bracket members has a first end portion which is securely attached to said tabletop, and also has an intermediate portion which is angled generally perpendicular to said first end portion, and further has a second end portion which is angled generally perpendicular to said intermediate portion and which is spaced above said tabletop to allow said plate to be disposed between said second end portion and said tabletop.

6. The router jig apparatus as described in claim 2, wherein said plate is a disk having an opening being centrally disposed therethrough and through which said router bit is rotatably extended, and also having arc-shaped slots being oppposedly disposed from one another and being disposed through said disk near a circumference thereof, said post being disposed proximate and adjacent to said opening through said disk.

7. The router jig apparatus as described in claim 6, wherein said plate retainer members include fastening members being attached to said tabletop and being disposed through said arc-shaped slots, and also include washers being attached to said fastening members for retaining said disk upon said tabletop.

8. The router jig apparatus as described in claim 7, wherein said template assembly further includes a handle being attached to said disk near the circumference thereof for rotating said disk back and forth to rout the work piece being support upon said post.

* * * * *